A. DEISS.
PROCESS OF MANUFACTURING CELLULOSE.
APPLICATION FILED MAY 19, 1909.
967,001.  Patented Aug. 9, 1910.
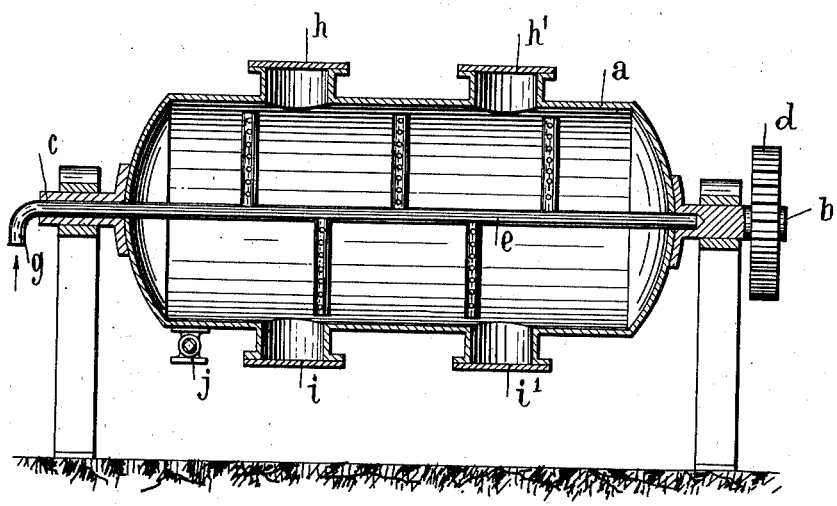

UNITED STATES PATENT OFFICE.

AUGUSTE DEISS, OF ST.-BARNABÉ, MARSEILLE, FRANCE.

PROCESS OF MANUFACTURING CELLULOSE.

967,001.  Specification of Letters Patent. Patented Aug. 9, 1910.

Application filed May 19, 1909. Serial No. 497,054.

*To all whom it may concern:*

Be it known that I, AUGUSTE DEISS, chemist, a citizen of the Republic of France, residing at 2 Allée Compassion, St.-Barnabé, Marseille, France, have invented a new and useful Improvement in Processes of Manufacturing Cellulose.

The present invention relates to a process for the manufacture of cellulose which offers great economy over processes hitherto in use, in that, besides the principal product—cellulose—two by-products, each having market value, are obtained. The first of these by-products consists of oxalates, from which oxalic acid can be extracted by the usual industrial processes, while the second consists in the entire and economical recovery of the alkaline liquors which are used again for treating new raw material.

The raw material used for the present process is the same as has hitherto been used in the manufacture of cellulose, that is to say, hemp, flax, the straw of corn, rice, rye, barley, maize, oats, cotton, as well as jutes, bohmeria or grass-cloth plant, white woods generally, and the agave, and all other plants or waste parts of plants the cellulose-yield of which can be considered sufficiently remunerative.

With reference to the quality of the cellulose obtained by the present process, it should be stated that it can be put to the same industrial uses as the cellulose known under the name of wood cellulose, while it is obtained at a considerably lower net cost.

One of the characteristics of this process lies in the fact that the retting of the raw materials from which the cellulose is to be extracted, is carried out under the action of ferments, by which means the advantage is gained that the process can be carried through with a rapidity hitherto unknown in this kind of operation.

Another characteristic of the process lies in that it presents the advantage of enabling the cooking operation to be effected energetically with the same units of heat, while at the same time it enables the recovery of one of the two by-products mentioned below to be effected, which by-product had been lost in all processes such as have been worked until now.

The method of operation is the following: The material to be treated is cut up to the required degree of division and is then subjected to the action of acidulated water in order to set free the chlorophyll gums, albumen and other substances likely to hinder the action of the defibrating agents; after about three hours of this treatment the acidity is neutralized by a suitable alkali and the treatment is continued for about three hours more, till the material is completely neutral. The liquid, which can be neglected is then drawn off, leaving only the solid matter in the vat.

In contradistinction from processes hitherto used, which moreover require considerable time, the process forming the subject of the present invention consists in effecting the retting by means of a ferment which will not only act to produce the retting action, but at the same time to produce a disinfecting action as distinguished from the putrefactive action caused by other ferments.

As a ferment, yeast derived from African esparto grass developed in strong salt water may be used, which has the property of being able to disintegrate the raw material, and at the same time preserve it from putrefaction, and is not injured by remnants of the solution with which the material has been previously treated. Ordinary ferments will perish in strong salt water and give a putrefactive action, and furthermore are very difficult to keep pure.

The preferred method of adding the ferment is by sprinkling the material with it. The ferment is fed by adding bran-water or any other suitable food.

It is obvious that fermentation is kept up by applying the required degree of heat.

Once the pores of the material are opened or the substance is well retted, the liquor is collected by decantation and kept for retting new raw material, the solid matter remaining in the vat is washed with warm water, the liquor being then poured off to be used as a ferment in subsequent operations. The raw material having been retted and washed in this way is then withdrawn from the vat and subjected to the action of strong lyes and superheated steam in a closed vessel.

A digester of any known type can be used as the closed vessel. An arrangement of apparatus suitable for the purpose is shown by way of example in the annexed drawing consisting essentially of an outer shell $a$ mounted on gudgeons $b$ and $c$ and adapted to be rotated by means of a wheel $d$ which is driven in any suitable manner. A stirring device *e* is mounted within the shell into which superheated steam is introduced from any convenient source through the pipe *g*. One or more supply apertures *h h'* and discharge apertures *i i'* are provided on the shell in the usual manner, and a cock *j* allows the liquid portions to be drawn off. Instead of having a rotatable shell and a fixed stirring device, the latter could be movable and the shell fixed or, if desired, both members could be arranged to revolve in opposite directions; in general it is sufficient to state that any apparatus fulfilling the requirements of a closed vessel, such as a digester, can be used for this stage of the process.

The causticity of the lyes employed can vary between 20 and 30 degrees Baumé. The steam pressure may vary from 3 to 5 atmospheres and the treatment in the closed vessel can last from 3 to 5 hours, according as to whether the cellulose is long or short-fibered. The cellulose fibers are by this time completely laid bare.

During the treatment in the closed vessel, a decomposition of the substances such as vasculose, pectose and other materials, takes place and soluble saline combinations are formed with the vegetable acids, such as oxalic or pectic acid or in short any other acid contained or developed in the raw material; these substances being all retained in the interior of the closed vessel and are used at a temperature below the combustion temperature, so that they are not lost by cremation in the kiln, as has been hitherto the case.

When the treatment is finished, the admission of steam is cut off, the movement of the apparatus is stopped and the liquids contained in the apparatus are drawn off through the cock *j*. The material which has undergone treatment is then taken out and subjected to the usual operations of crushing, tearing, washing and bleaching before placing it upon the market, while the liquids referred to undergo a further treatment in order to extract from them the already mentioned by-products, namely the vegetable acids derived from the raw material employed, from which the commercial acids are ultimately obtained. These liquids are poured into a reservoir and are treated with superheated steam which is blown into the mass with the subsequent addition of a quantity of lime, sufficient to decolorize the liquid and to precipitate the salts of lime and the organic acids contained in the liquid, while at the same time regenerating the alkaline bath. This bath, having been regenerated and brought to a density varying from 20 to 30 degrees Baumé, is used for subsequent operations. The precipitation of the salts of the organic acids is then pressed in order to deliver them to the industry, in which they are treated in the usual way in order to be transformed into the commercial acids.

Strong lyes offer the advantage that by their use the operation is shortened without this fact causing any loss, considering that they are wholly and economically recuperated while at the same time causing economy of fuel and in the consumption of lime over current methods of manufacture.

I claim:

1. The process of manufacturing cellulose which consists in sowing the previously prepared material with a ferment derived from esparto grass, allowing the fermentation to take place, washing the material, pouring off the ferment for further use, cooking and defibrating the material, collecting the lyes resulting from the cooking process, and separating the cellulose, substantially as described.

2. The process of manufacturing cellulose which consists in subjecting the material to the action of acidulated water, neutralizing the acidity, drawing off the liquid, sowing the material with a ferment derived from esparto grass, heating the material to aid the fermentation, washing the material, drawing off the liquid, subjecting the material in a closed vessel to the action of a strong lye and superheated steam, and finally separating the cellulose, substantially as described.

In witness whereof I have hereunto set my hand this 11th day of May 1909, in presence of two subscribing witnesses.

AUGUSTE DEISS.

Witnesses:
 R. H. BRANDON,
 D. H. BRANDON.